May 16, 1950          S. P. MILLER          2,507,539
PROCESS OF PREPARING HYDROGEN-NITROXYLENE MIXTURE
SUITABLE FOR PRODUCTION OF XYLIDINE
Filed Feb. 6, 1946
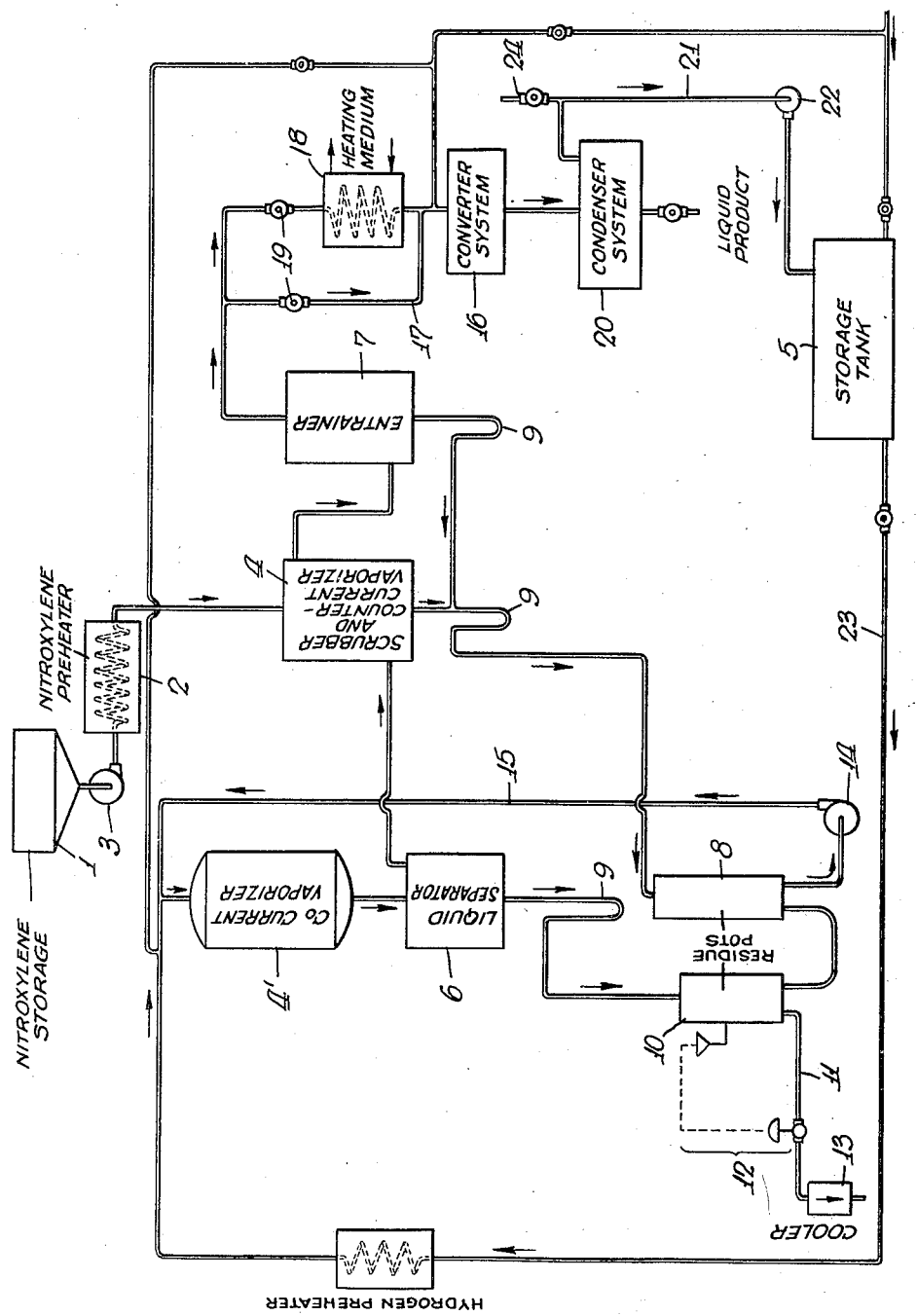
INVENTOR
Stuart P. Miller
BY
Benjamin Sweedler
ATTORNEY Patented May 16, 1950

2,507,539

UNITED STATES PATENT OFFICE 2,507,539

PROCESS OF PREPARING HYDROGEN-NITROXYLENE MIXTURE SUITABLE FOR PRODUCTION OF XYLIDINE

Stuart P. Miller, Scarsdale, N. Y., assignor to Allied Chemical & Dye Corporation, New York, N. Y., a corporation of New York Application February 6, 1946, Serial No. 645,938

3 Claims. (Cl. 260—580)

The invention described herein is subject to a license of this date to the Government of the United States.

This invention relates to production of xylidine by vapor phase catalytic hydrogenation of nitroxylene.

It is an object of this invention to provide a new and particularly advantageous method of producing xylidine by vapor phase catalytic hydrogenation of nitroxylene employing crude nitroxylene of the type readily available commercially as the source of nitroxylene hydrogenated.

It is a particular object of this invention to provide a process in which, notwithstanding the use of such crude nitroxylene, vaporization may be effected with minimum hazard and high efficiency and high catalyst activity may be maintained over a long period of time.

The prior art describes vapor phase catalytic hydrogenation of aromatic nitro compounds (usually nitrobenzene) employing as catalysts various metals such as nickel, cobalt, copper, iron, tin, or silver. The reaction mixture for such processes is generally prepared by vaporizing the nitro compound, e. g., nitrobenzene, in a stream of hydrogen. In the processes of the prior art it has been customary, because of the readiness with which hydrogenation catalysts are poisoned, to employ only a substantially pure nitro compound prepared by carefully purifying the commercially available nitro compound.

Moreover, since the prior art work has been limited almost exclusively to nitrobenzene hydrogenation, information, if any, on how a crude nitro compound may be employed for vapor phase catalytic hydrogenation could not be relied upon for determining the conditions under which crude nitroxylene may be employed for production of xylidine by vapor phase catalytic hydrogenation.

In a commercial process for nitration of aromatic hydrocarbons, some proportion of polynitrated hydrocarbons normally is produced. Thus, analysis of various lots of crude commercial mixed mononitroxylenes has shown the presence of from about one to more than ten percent. by weight of polynitro compounds consisting principally of mixed dinitroxylenes which are sufficiently volatile at the temperatures required for preparation of mononitroxylene-hydrogen vapor mixtures suitable for commercial scale vapor phase hydrogenation to be present in appreciable proportion in such mixtures. Dinitroxylenes can be hydrogenated in the vapor phase to aminoxylidines, but tend to foul the catalyst and thus to shorten its life, particularly if present in amounts in excess of about two percent. of the weight of total nitro compounds in the hydrogen-organic vapor mixture. The aminoxylidines formed by such hydrogenation are disadvantageous in that they are readily soluble in the water produced in the reaction, are not readily separated from their aqueous solution by solvent extraction and are toxic, so that they introduce a problem of disposal of this water.

Crude nitroxylene according to my discovery is vaporized in an atmosphere of hydrogen by subjecting the crude to elevated temperatures not exceeding about 230° C. The vaporization residue formed, when it is desired to discharge same or any desired portion thereof to the atmosphere, is cooled to below 100° C. Also, I have found that not only commercial nitroxylene, but also commercial nitroxylene vaporization residues containing up to nearly 50 percent. by weight dinitroxylenes, are such excellent solvents for any tarry materials, either originally present in or formed by heating commercial nitroxylene, that these tarry materials can be prevented from separating out on vaporizer surfaces and from thereby fouling the vaporizer by the expedient of keeping such surfaces wet at all times with liquid nitroxylene or with a liquid nitroxylene-dinitroxylene mixture. It has been found that if no precautions are taken to avoid vaporizer fouling, the tar first separating out is gradually converted to insoluble coke-like material which adheres very tenaciously to the vaporizer surfaces and seriously impedes heat transfer; the coke-like material thus formed is difficult to remove even by the hazardous process of burning off in a stream of air at red heat. Observance of the above noted conditions, namely, maintaining the crude at a temperature not exceeding about 230° C. in an atmosphere of hydrogen, cooling the residue to below about 100° C. before exposure to air and flushing the vaporizer surface with nitroxylene or nitroxylene residue eliminates explosion hazards.

I have further found that the vapors in equilibrium with liquid nitroxylene-dinitroxylene mixtures at temperatures in the neighborhood of 200° C. contain only from about one-fourth to one-fifth as much dinitroxylene as the liquid itself so that it is possible by application of fundamental distillation principles to maintain a relatively low proportion of dinitroxylene in the vapors obtained by partial vaporization of a nitroxylene-dinitroxylene mixture.

More specifically, crude nitroxylene of commerce, consisting primarily of one or more nitroxylenes but containing one or more of the following types of impurities: 1% or more polynitrated material (i. e., dinitroxylene); 0.1% or more of alkali-soluble material (i. e., nitrophenols); 0.1% or more materials remaining as a tarry residue on total distillation of a sample in a stream of inert gas at a temperature up to 250° C. may, according to my discovery, be employed as the source of nitroxylene in preparing a gaseous mixture of hydrogen and nitroxylene suitable for production of xylidine by vapor phase catalytic hydrogenation by preparing such gaseous mixture in a multi-stage vaporization system in which a recycled crude liquid mononitroxylene residue rich in impurities is first contacted with hydrogen in equipment arranged for complete wetting of all heat exchange surfaces with liquid residue, liquid is separated from the resulting vapor-containing hydrogen stream, this gas stream is then subjected to countercurrent scrubbing (accompanied by additional vaporization) with crude liquid nitroxylene, the liquid from the scrubbing equipment is added to the residue used for first contact with additional hydrogen and the scrubbed hydrogen-vapor mixture is conducted through an entrainment separator and superheater to the hydrogenation converter train; residual liquid is periodically or continuously withdrawn to keep the system in balance with respect to accumulation of impurities in the recycled residue. The residual liquid is cooled to below 100° C. prior to exposure to the atmosphere.

A hydrogen-nitroxylene vapor mixture prepared as above described may be reacted over a nickel or other hydrogenation catalyst known in the art and described, for example, in Sabatier-Reid's book on Catalysis in Organic Chemistry, to form a desirable xylidine product, and high efficiency of operation may be maintained in such hydrogenation with long catalyst life.

The crude nitroxylene that may be employed in the process of my invention is a nitroxylene which predominates in the desired mononitroxylene component but contains generally from 3% to 10% impurities including: polynitrated material, e. g., dinitroxylenes; alkali-soluble materials, e. g., nitrophenols, tarry or tar-forming materials and hydrocarbons. The mononitroxylene component of the crude nitroxylenes commercially available is generally a mixture of several isomeric mononitroxylenes. It may be preheated to a temperature within the range of 100°–200° C., preferably 190°–200° C. before use.

The vaporization process of my invention does not necessarily remove all polynitroxylenes. Thus, a small amount of dinitroxylene may remain in the nitroxylene vapor sent to the hydrogenation zone and be successfully hydrogenated there along with the mononitroxylene, without seriously interfering with catalyst activity, to form a xylidine product containing a small amount of aminoxylidine. However, the vaporization process as above described does appear to remove such excessive amounts of polynitro compounds or other impurities as would tend to poison the catalyst or otherwise interfere with hydrogenation.

Recirculation of heavy residual liquid has the advantage of further exhausting said liquid of the desirable mononitroxylene component still contained therein. The recirculation of unvaporized liquid, which, as above pointed out, is an excellent solvent for tarry materials present in or formed by heating commercial nitroxylene, furthermore, serves to flush vaporizer surfaces free from deposits which may be explosive, separating out during vaporization of the crude nitroxylene. Such deposits may be made up of slightly soluble solids precipitating out of the crude nitroxylene as it is vaporized as well as tars formed by polymerization or condensation of normally liquid impurities in the crude nitroxylene.

Scrubbing of the hydrogen-nitroxylene vapor mixture with crude liquid nitroxylene, preferably in a countercurrent scrubber and vaporizer in which the vapor leaves the scrubber at the top where the crude nitroxylene enters, at which point in the scrubber both the liquid and the vapor contain the smallest proportion of dinitroxylene and the vapors in equilibrium with liquid nitroxylene-dinitroxylene mixture at temperatures of about 200° C. contain from about one-quarter to one-fifth as much dinitroxylene as the liquid, results in the production of a vapor stream low in dinitroxylene. The crude liquid nitroxylene introduced in the combined scrubber and vaporizer serve to flush heat exchange surfaces therein free from deposits which may be explosive, separating out during vaporization of the crude nitroxylene. While as above pointed out it is preferred to employ countercurrent flow of crude nitroxylene and hydrogen-nitroxylene vapor in the first stage of the vaporization, it is preferred to employ cocurrent flow in the second stage in which heavy residual liquid is recirculated because it has been found that with the flow of hydrogen and nitroxylene vapor and the heavy residual liquid in a cocurrent direction, less entrainment of the liquid by the vapor stream takes place.

In addition to treatment of the hydrogen-nitroxylene mixture formed in the vaporizer with recirculated heavy liquid, I have found it desirable in preferred operation in accordance with my invention to pass the hydrogen-nitroxylene mixture withdrawn from contact with the recirculated liquid through entraining means to precipitate liquid droplets contained therein. Such entraining means may consist of a series of baffles, a packed tower, or other means where solid surfaces cause the hydrogen-nitroxylene mixture to take a tortuous path. I have found a packed tower to be particularly advantageous for this purpose. Such a tower may be of the same type generally employed for countercurrent gas and liquid contact, but without a supply of liquid for contact with the gas stream.

A preferred method of carrying out the process of my invention applied to preparation of a reaction mixture for vapor phase hydrogenation of nitroxylene over a nickel catalyst is illustrated in the accompanying drawing.

In the process of the drawing the liquid crude nitroxylene is pumped from storage tank 1 through preheater 2 by means of proportioning pump 3 by which the amount of liquid employed in the process can be regulated. The pump 3 also serves to bring the liquid crude nitroxylene up to the working pressure maintained in the entire system which in the preferred operation illustrated in the drawing is about 10 atmospheres. From preheater 2 the liquid crude passes to the first stage of the vaporizer system, namely, the scrubber and countercurrent vaporizer 4.

Hydrogen is passed from storage tank 5 through a preheater to the second stage of the vaporizer system, namely, the cocurrent vaporizer 4'. The hydrogen and crude liquid nitroxylene are employed in the proportion of 6 to 20, preferably 6 to 15 cubic feet hydrogen, measured at room temperature and the operating pressure per pound of nitroxylene vaporized.

The vaporizer system in the preferred form illustrated contains four units. The first of these is the cocurrent vaporizer 4' which may advantageously consist of a bank of vertical tubes through which, when this unit is in operation, the crude nitroxylene residue and hydrogen pass cocurrently downwards. The second unit is the liquid separator 6 through which the predominantly gaseous hydrogen nitroxylene mixture from vaporizer 4' passes and which serves to separate unvaporized liquid, preferably by means of baffles around which the gaseous stream passes. The third unit of the vaporizer system illustrated is the countercurrent vaporizer 4 which may advantageously be in the form of a packed tower in which the gaseous stream passes upwardly and liquid crude nitroxylene flows downwardly. The fourth unit is the entrainer 7 which may also advantageously be in the form of a packed tower without provision for an entering liquid stream. This unit may be heated by steam or otherwise. The predominantly gaseous stream passes upwardly through this tower where the fog is dissipated and entrained liquid droplets are removed. All unvaporized liquid draining from unit 4 and liquid separated in entrainer 7 passes into residue pot 8 through mains provided with liquid seals 9. Liquid separated in separator 6 passes through a main provided with a liquid seal 9 into residue pot 10 which is communicably connected with residue pot 8. Residue pot 10 is equipped with a residue conduit 11 and with an automatic level control 12 of any well-known type and communicates with a cooler 13 which cools the residue withdrawn to 100° C. or lower before it is exposed to the air. From the residue pot 8 a part of this residual liquid is recirculated by pump 14 through recirculation main 15 to cocurrent vaporizer 4'.

Heat for vaporization may be supplied either by heating the vaporizers 4 and 4', or by preheating the hydrogen and liquid crude nitroxylene, or both. Thus, when vaporizer 4' is in the preferred form of a bank of vertical tubes, these are readily heated by mounting them within a housing through which heating medium may circulate. Similarly, when vaporizer 4 is in the form of a packed tower it may be heated by a jacket around the tower or by heating conduits within the packing. In preferred operation, the hydrogen is preheated to a temperature of 190° to 200° C., the nitroxylene is preheated in preheater 2 to a temperature of about 190° to 200° C., and additional heat is provided as above indicated either in vaporizer 4 or in vaporizer 4'. Sufficient heat is thus provided to vaporize up to about 85%–98% of the mononitroxylene component of the crude and to produce a hydrogen-nitroxylene gaseous reaction mixture at a temperature of about 185° to 200° C., containing from 7 to 20, preferably 7 to 15, cubic feet hydrogen (measured at room temperature and at the working pressure) per pound vaporized nitroxylene. The mixture on leaving entrainment separator 7 may have a temperature of about 188° to 200° C.

A substantial proportion of the residual liquid is generally withdrawn from residue pot 10 to avoid the build-up of undesirable high-boiling impurities in this liquid. In general from 1% to 50%, preferably 1% to 10%, liquid may thus be withdrawn, the remaining 50% to 99%, preferably 90% to 99% being recirculated through cocurrent vaporizer 4'. The gaseous reaction mixture from the vaporizer system may be passed directly to the converter system 16 through valved conduit 17, or may first be passed through vapor superheater 18 by proper adjustment of valves 19, and thence to converter system 16. Additional hydrogen may also be added to this gaseous reaction mixture, if desired.

The converter system generally contains one or more catalyst chambers which may be in the form of tubes, for example, packed with a pumice-supported nickel catalyst or packed with other catalysts as above described. The converter tubes may advantageously be contained within a shell suitable for circulation of cooling or heating medium as described, for example, in Wroby Patent 2,355,938, issued August 15, 1944. When the desired conversion has taken place the reaction gases are promptly withdrawn from converter system 16 and passed to condenser system 20 where the xylidine product, the water of reaction, and any other normally liquid material is condensed out and cooled; the xylidine product being withdrawn through the valve controlled pipe line with which is associated the legend "liquid product" on the drawing. The non-condensible gas, including the minor proportions of water vapor, etc., in equilibrium with the liquid condensate at the liquid temperature, is withdrawn through conduit 21. It generally consists substantially of unreacted hydrogen and may be recirculated by blower 22 to tank 5 and thence through valved conduit 23 leading to cocurrent vaporizer 4' and reused in the process of the invention. Should there be substantial accumulation of inert gases, it is desirable to bleed off a portion of the non-condensible gas through valved conduit 24.

In preferred operation, the heaters, the vaporizer system, the converter system, the condenser system and all connecting piping are maintained under the working pressure which, as above stated, is preferably about 10 atmospheres.

The following example is illustrative of the conditions employed, i. e., temperatures and rates of flow of hydrogen, crude nitroxylene, recirculated residual liquid and discharged residual liquid in the method of carrying out the process of my invention.

*Example*

A crude nitroxylene having the following composition by analysis:

| | Per cent |
|---|---|
| Water | 0.1 |
| Unnitrated hydrocarbons | 3.3 |
| Dinitroxylene | 4.5 |
| Mononitroxylene | 92.1 | is preheated to 190° C. and is introduced at the rate of 250 pounds/hour into the top of the countercurrent vaporizer. A hydrogen-nitroxylene vapor mixture whose origin is described below is introduced into the bottom of the same unit, under conditions such that the stream of hydrogen and nitroxylene vapors leaving this vaporizer has the composition (of condensible materials)

|   | Per cent |
|---|---|
| Dinitroxylene | 1.1 |
| Mononitroxylene | 95.3 |
| Unnitrated hydrocarbons | 3.6 | and is at a temperature of 194° C. and such that the liquid draining from the unit (at 200° C.) has the approximate composition 17.5% dinitroxylene by weight
82.5% mononitroxylene This liquid drains into residue pot 8 from where it is recirculated in a down-flow direction through the concurrent vaporizer 4' by means of the pump 14 at the rate of 5.5 to 9.5 gallons per minute per square foot of cross sectional area of the vaporizer (without packing). Simultoneously, a stream of hydrogen, comprising a mixture of fresh gas and gas recirculated from the hydrogenation operation, is introduced into the top of the cocurrent vaporizer 4', this gas having been previously preheated to about 190° C. The cocurrent vaporizer 4' is externally heated sufficiently to maintain a temperature of 200° C. in the stream of gas and unvaporized liquid issuing therefrom.

The vapor-liquid mixture from the vaporizer 4' is passed through the liquid separator 6. The liquid flows to the residue pots 10 and 8 for recirculation. These pots are large enough, i. e., 50–100 gallons working capacity, to hold a considerable accumulation of residues from both vaporizers so that there is ample liquid available for recirculation and also the composition of the liquid approximates that of the cocurrent vaporizer residue, viz., 50%–55% mononitroxylene, 45%–50% dinitroxylene. Once an adequate supply of residue is accumulated, further additions are discharged by a residue pot level control device, at the rate of about 19.0 pounds/hour. The hydrogen-vapor mixture from the cocurrent vaporizer after passing through the liquid separator 6 is introduced, as mentioned above, into the bottom of the countercurrent vaporizer.

In summary:

Liquid feed, 250 lbs./hr.
Hydrogen feed, 2540 cubic ft. per hour at 35° C., 160 lbs. gauge, i. e., 11 cubic feet per pound vaporized nitroxylene
Vaporized, 231 lbs./hr.
Residue, 19 lbs./hr.

The nitroxylene-hydrogen vapor mixture prepared as described above was passed over 1.5 cubic feet of a nickel-on-pumice catalyst maintained at 200°–300° C. Substantially complete conversion to xylidine was obtained both at the start and after one week of continuous operation.

For purposes of comparison it is noted that when using nitroxylene-hydrogen vapor mixture produced in laboratory equipment in which no provision was made either for recirculation of vaporization residue or for scrubbing the vapors with fresh crude nitroxylene, the vaporizer became blocked with carbonaceous material and appreciable fouling of the catalyst was observed in ten hours of operation.

Since certain changes may be made in carrying out the above process without departing from the scope of the invention, it is intended that all matter contained in the above description shall be interpreted as illustrative and not in a limiting sense.

What is claimed is:

1. A method of preparing, from crude nitroxylene comprising predominantly mononitroxylene, a gaseous mixture of hydrogen and nitroxylene suitable for production of xylidine by vapor phase catalytic hydrogenation, comprising the following steps: step 1 passing crude nitroxylene in the liquid phase in contact with a hydrogen-nitroxylene vapor stream over heat exchange surface and so as to completely wet said surface while imparting sufficient heat to the liquid to vaporize only a portion thereof and form a predominantly gaseous hydrogen-nitroxylene mixture suitable for production of xylidine while maintaining the temperature to which the nitroxylene is subjected during said heating at not exceeding about 230° C., step 2 withdrawing unvaporized residual liquid from step 1, step 3 passing residual liquid in contact with hydrogen over heat exchange surface and so as to completely wet said surface while imparting sufficient heat to the residual liquid to vaporize only a portion thereof and form a predominantly gaseous hydrogen-nitroxylene mixture which is employed in step 1 while maintaining the temperature to which the residual liquid is subjected during said heating at not exceeding about 230° C., and step 4 withdrawing unvaporized residual liquid produced in step 3, recycling a portion of it through step 3, withdrawing the remainder and cooling the residual liquid thus withdrawn to a temperature below 100° C. prior to exposure thereof to the atmosphere.

2. A process as defined in claim 1, in which in step 1 the crude nitroxylene and hydrogen-nitroxylene vapor flow in countercurrent direction through a tower, the hydrogen-nitroxylene mixture being withdrawn from the top of the tower and in step 3 the residual liquid and hydrogen flow in cocurrent direction.

3. A process for production of xylidine by vapor phase catalytic hydrogenation of nitroxylene, which comprises the following steps: step 1 passing crude liquid nitroxylene consisting predominantly of mononitroxylene containing from about 3% to 10% impurities including polynitrated material, alkali-soluble materials, tar forming materials and hydrocarbons downwardly in countercurrent contact with a rising hydrogen-nitroxylene vapor stream over heat exchange surface and so as to completely wet said surface while imparting sufficient heat to the liquid to vaporize only a portion thereof and form a predominantly gaseous nitroxylene-hydrogen mixture and while maintaining the temperature to which the nitroxylene is subjected during said heating at not exceeding about 230° C., step 2 withdrawing unvaporized residual liquid from step 1, step 3 passing the residual liquid from step 2 in cocurrent flow with hydrogen over heat exchange surface and so as to completely wet said surface while imparting sufficient heat to the residual liquid to vaporize only a portion thereof and form a predominantly gaseous hydrogen-nitroxylene mixture which is employed in step 1, while maintaining the temperature to which the residual liquid is subjected during said heating at not exceeding about 230° C., step 4 withdrawing unvaporized residual liquid produced in step 3 and recycling it through step 3, step 5 passing the hydrogen-nitroxylene mixture produced in step 1 through an entraining zone to remove substantially all liquid phase material therefrom and produce a gaseous mixture of hydrogen and nitroxylene vapor having a temperature in the range of about 188° to 200° C. and containing from about 7 to 20 cubic feet hydrogen measured at room temperature and at the working pressure per pound nitroxylene, step 6 passing said gaseous mixture to a catalytic converter for production of xylidine therefrom by vapor phase catalytic hydrogenation, and step 7 withdrawing from the unvaporized residual liquid recycled in step 3 from 1% to 10% thereof to prevent build-up of impurities in the recycled liquid and cooling said liquid thus withdrawn to a temperature below 100° C. prior to exposure thereof to the atmosphere.

STUART P. MILLER.

REFERENCES CITED

The following references are of record in the file of this patent:

UNITED STATES PATENTS

| Number | Name | Date |
| --- | --- | --- |
| 949,954 | Bedford | Feb. 22, 1910 |
| 2,316,564 | Cockerill | Apr. 13, 1943 |
| 2,402,423 | Mason | June 18, 1946 |
| 2,411,264 | Hachmuth | Nov. 19, 1946 |
| 2,430,421 | Gage | Nov. 4, 1947 |